R. M. MARVIN.
DRAFT-EQUALIZER.
No. 172,756.  Patented Jan. 25, 1876.
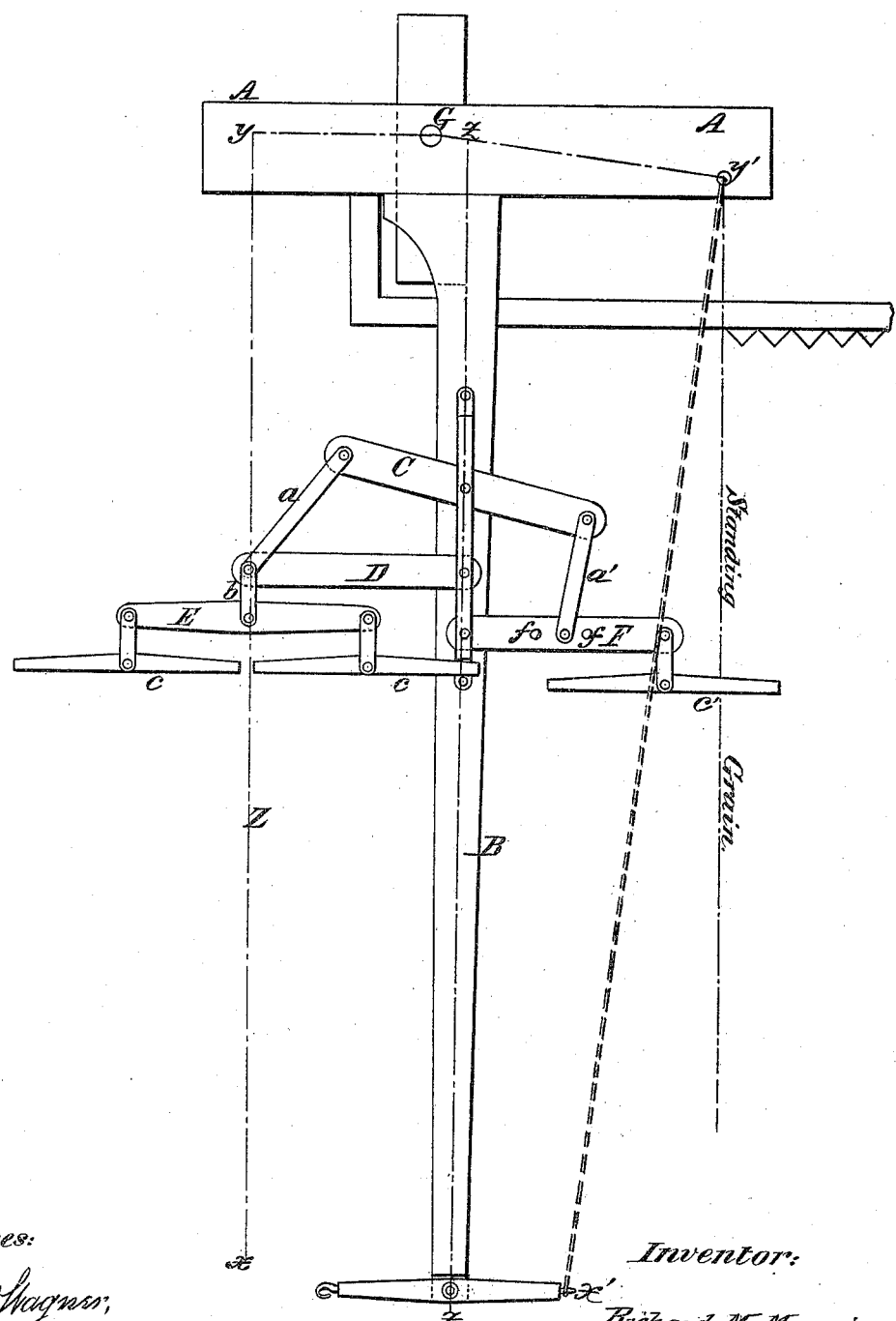
Witnesses:
Inventor:
Richard M. Marvin
By Johnson & Johnson
his Att'ys.

UNITED STATES PATENT OFFICE.

RICHARD M. MARVIN, OF MANCHESTER, IOWA.

IMPROVEMENT IN DRAFT-EQUALIZERS.

Specification forming part of Letters Patent No. 172,756, dated January 25, 1876; application filed October 25, 1875.

*To all whom it may concern:*

Be it known that I, RICHARD M. MARVIN, of Manchester, in the county of Delaware and State of Iowa, have invented certain new and useful Improvements in Three-Horse Draft-Equalizers, of which the following is a specification:

My improvement relates to the means of attaching three horses to a harvester or other analogous machine when the pivot of torsion is outside the line of draft, placing two horses on one side of the tongue and one on the other, and equally distributing the labor of drawing such machine, and at the same time constructing the same so as to equalize the side draft or torsion caused by applying more power on one side of the tongue than on the other.

I am aware that various plans have been devised to equalize the side draft of three horses, two being on one side of the tongue and one on the other, and that for this purpose three arms have been pivoted to the tongue, connected to each other, and adapted to receive the whiffletree and the double-tree; but my invention differs from any such equalizers in the particulars of construction, whereby a lever, an evener, and a pivoted bar or spreader are attached to the tongue at three points of attachment in the same line, and with the spreader in intermediate position, for joint operation to effect the desired result.

The accompanying drawing represents a plan view of my invention as applied to the tongue or draft-pole of a harvester, and shows its several parts in normal position.

A A represent so much of the frame of a harvester or other machine or vehicle subject to side draft or torsion as is necessary to the understanding of my invention in connection therewith. B is the tongue or draft-pole rigidly secured to said frame. A line, $zz$, drawn down the middle of the tongue represents the line of draft in vehicles and machines. C is an evener or lever, pivoted in its center to the tongue B, and therefore having equal arms. Pivoted to the ends of these equal arms are loose connections $a$ $a'$, which connections may be chains or straps.

The connection $a$ is pivoted to a spreader, D, which is simply a bar pivoted to the draft-pole or tongue in front of the evener.

Connected to the spreader by the same pivot as is the strap or chain $a$ is a loose connection or link, $b$, to which a swinging bar, E, having equal arms, is connected by its middle, which bar carries at its extremity the whiffletrees $c$ $c$.

To these whiffletrees the two horses which walk on one side of the tongue are hitched. The other end of the evener C is connected, through loose connection $a'$, to or near to the middle of a bar, F, pivoted to the tongue.

This bar F has connected to its outer end the whiffletree $c'$ for the single horse, and is, therefore, a lever of the second kind, and is pivoted or attached to draft-pole in front of spreader D, so that the push of the single horse against the tongue is in front of the point of the two horses crowding against the tongue, which enables the single horse to crowd the tongue back against the two horses. This point of crowding being farther from the fulcrum G, he can resist the pressure of a greater power applied to the other side. This becomes apparent, for the nearer to the end of the tongue the less the pressure is required to overcome a greater pressure applied to the fixed end.

Supposing the connection $a'$ to be pivoted exactly at the middle of the bar or lever F, then the horse attached to whiffletree $c'$ will exert the same power upon his end of the evener C as the two horses on the other side of the draft-pole do upon their end of the evener, so that the inferiority of power of the single horse will be counterbalanced by the advantage or leverage.

My arrangement is especially useful in harvesting, for, if a single lever only were used, the short arm thereof must be given to the two horses, and the long one to the single one, which would then be compelled to walk through and injure the standing grain; and by using the spreader D I am enabled to increase the distance of the greater power from the line of draft-pole, and not increase their power, and thereby allow it sufficient room for free action.

As the horses may be unequal in strength, I provide a number of adjustment-holes, $f f$, in the bar or lever F, so as to alter as desired the leverage exerted by the single horse.

The loose connections $a\ a'$ are of unequal length, and so proportioned to one another as to form, when the horses are abreast, and the parts of my arrangement are in normal position, so that the bar D and lever F form right angles with the draft-pole, equal obtuse internal angles with the line of the evener C.

It is obvious that when the powers fall out of line, the angle of the connections to the line of the evener will be changed, that of the one in advance being increased, and that of the one falling behind being lessened, so as to approach a right angle. The pull upon the ends of the evener C will consequently be more direct for the power falling behind, and less direct for the power advancing to the front. The former will, therefore, have less of the strain than the latter, which will be compelled to fall back into a more advantageous position—that is, abreast of the other power, which will thereby be compelled to regain a corresponding position.

It will be seen that this self-correcting tendency of the team increases in proportion to the departure of the two powers from their proper relative positions.

G represents the point of support—$i\ e.$, the drive-wheel of a harvesting-machine, and is the point on which the machine swings as a pivot in its tendency to move sidewise, in other words, the pivot of torsion. $x\ y$ represent the line of draft of the greater power $z$, produced parallel with the line of draft of the machine or tongue, and falls upon the line G $y$ at a right angle at the point $y$. $x'\ y'$ represent the line of draft of the lesser power, and is a diverging line of draft, and to equalize the torsion caused by the greater power $z$ being applied on one side of the tongue, the line $x'\ y'$ must diverge and fall upon the line G $y'$ at right angles, at a point distant from the pivot G, so the line G $y'$ shall be to the line G $y$ as the greater power $z$ is to the lesser power; or, in other words, the greater power $z$, working by two attachments to the tongue B, exerts the same power to turn the machine against the lesser power, when attached at the outer end of the spreader D, that it would if attached to a lever extended from the point G to the point $y$, and attached at the point $y$, and for the lesser power working close to the tongue or line of draft of the machine an attachment must be so constructed that the lesser power shall work on a leverage, to equalize the power, and, at the same time, must work on a line of draft which will exert the same power to turn the machine back against the two horses, or greater power when attached to the outer end of the lever F, that it would if attached to a lever extended from the pivot G to the point $y'$, and the lesser power was attached at the point $y'$.

Since the point $y'$ is within the line of the falling grain, it cannot be reached by a line parallel with the tongue or line of draft of the machine, as that would compel the single horse to walk in the standing grain; but it is accomplished by constructing the same so the lesser power shall work on a diverging line of draft $x'\ y'$ by attaching the single horse to the outer end of the lever F, which is outside the line of grain, and on the diverging line $x'\ y'$. It (the lesser power) has the same power to turn the machine against the two horses it would have if attached to a lever extended from the pivot G to the point $y'$ at the point $y'$. This diverging line of draft may be used on various modes of construction of three-horse draft attachments or equalizers, for working on harvesters or other analogous machines.

It will be seen, by my improved arrangement of devices, the machine will be kept, by the just proportion of the draft, on the points $y$ and $y'$ in a line with the line of advance. Should it sway aside (which is equivalent to the powers falling out of line) the arrangement before described of the connections $a$ and $a'$ will instantly correct it.

I claim—

The construction of a three-horse draft attachment or equalizer with lever or evener C, pivoted bar or spreader D, and lever F, all attached to the tongue B at three points of attachment, in the same line, and with the spreader D in intermediate position, for operation substantially as set forth.

In testimony that I claim the foregoing I have affixed my signature in the presence of two witnesses.

RICHARD M. MARVIN.

Witnesses:
 F. O. MICKLER,
 WM. A. ROE.